UNITED STATES PATENT OFFICE.

JOHANN BAMMANN AND MORITZ ULRICH, OF ELBERFELD, GERMANY, ASSIGNORS TO THE FARBENFABRIKEN, VORMALS FR. BAYER & CO., OF SAME PLACE.

TETRAZO DYE.

SPECIFICATION forming part of Letters Patent No. 496,392, dated May 2, 1893.

Application filed June 11, 1892. Serial No. 436,396. (Specimens.) Patented in England August 26, 1890, No. 13,443; in Austria-Hungary November 28, 1890, No. 35,494 and No. 58,417; in France December 6, 1890, No. 210,033, and in Italy April 27, 1891, XXV, 29,631, LVIII, 100.

*To all whom it may concern:*

Be it known that we, JOHANN BAMMANN and MORITZ ULRICH, doctors of philosophy, chemists, subjects of the Emperor of Germany, residing at Elberfeld, Prussia, Germany, and assignors to the FARBENFABRIKEN, VORMALS FR. BAYER & CO., of Elberfeld, Germany, have invented a new and useful Improvement in the Manufacture of Tetrazo Dye-Stuffs, (for which the aforesaid FARBENFABRIKEN have already obtained Letters Patent in England, No. 13,443, dated August 26, 1890; in France, No. 210,033, dated December 6, 1890; in Austria-Hungary, No. 35,494 and No. 58,417, dated November 28, 1890, and in Italy, Vol. XXV, No. 29,631 and Vol. LVIII, No. 100, dated April 27, 1891,) of which the following is a specification.

Our invention relates to the production of a new coloring-matter by combining one molecular proportion of tetrazomonoethoxydiphenyl chlorid with two molecular proportions of the sodium salt or other soluble alkaline salt of the amidonaphtholdisulpho acid, termed in chemical practice 1.8-amidonaphthol-beta-disulpho acid, which is obtained by us by reducing the mononitro derivative of the naphthalenetrisulpho acid described in the German patent No. 38,281 dated September 2, 1885, and melting with alkalies at temperatures from about 180° to 190° centigrade the resulting naphthylaminetrisulpho acid as described by us in a separate specification, Serial No. 432,495, filed May 10, 1892, and which may also be produced by heating with diluted acids or alkalies the diamidonaphthalenedisulpho acid resulting by dinitrating the so-called alphanapthalenedisulpho acid of Ebert and Merz and reducing the formed dinitro compound.

In carrying out our process practically we proceed as follows: 22.8 kilos, by weight, of monoethoxybenzidine are dissolved in water with the addition of about sixty kilos, by weight, of muriatic acid and diazotized by slowly adding fourteen kilos of sodium nitrite dissolved in water. The so formed solution of tetrazomonoethoxydiphenyl chlorid is allowed to flow slowly at about from 5° to 10° centigrade and with the addition of sodium carbonate in excess into the watery solution of 72.6 kilos, by weight, of the sodium salt of the 1.8-amidonaphthol-beta-disulpho acid obtained for example by melting with alkalies at temperatures from about 180° to 190° centigrade the naphthylaminetrisulpho acid which is formed by reducing the mononitro derivative of the naphthalenetrisulpho acid described in the German patent No. 38,281 dated September 2, 1885. We have found that it is very advantageous to maintain the liquid alkaline by the addition of sodium carbonate during the whole operation of coupling the tetrazo chlorid with the above amidonaphtholdisulpho acid. After about twenty-four hours the formation of the new tetrazo dye-stuff is finished. The greater part of the latter directly separates and the portion remaining dissolved is precipitated by the addition of common salt. After salting out perfectly the dye-stuff produced in the above described manner is filtered off, pressed and dried.

Our new dye-stuff which corresponds to the following formula:

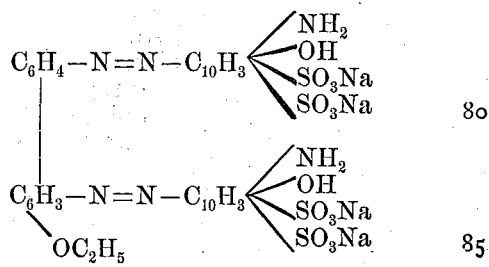

possesses the following properties: When thoroughly pulverized it forms a grayish-black powder, which dissolves in water with blue color showing a violet tinge especially in diluted solutions. It is dissolved by soda-lye with violet color, by sodium carbonate and ammonia liquid with blue color. The color of its solutions in water is not changed by the addition of sodium carbonate or ammonia liquid, only on adding soda-lye in a great excess the blue color changes into violet. When its watery solutions are mixed with strong mineral acids the color, likewise, does not change. On the addition of common salt to its solutions in water it is precipitated as a dark blue fine powder. It dissolves in concentrated sulphuric acid with blue color and the sulphuric acid solution when gradually mixed with water assumes at first a reddish-blue color and after some time a finely pulverized precipitate separates. It dyes unmordanted cotton in alkaline soap baths a greenish-blue fast against alkalies.

Our new tetrazo coloring-matter differs by its composition from the similar products which we have claimed in a separate specification, Serial No. 436,396, filed June 11, 1892, and which possess the following compositions:

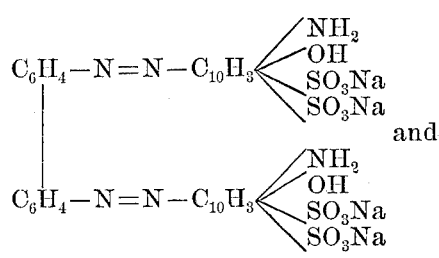
and
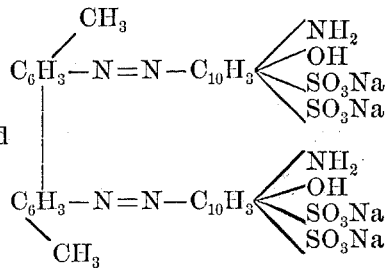

as the latter two dye-stuffs are obtained by the combination of one molecular proportion of either tetrazodiphenyl chlorid or tetrazoorthoditolyl chlorid with two molecular proportions of the said 1.8-amidonaphthol-beta-disulpho acid. It differs also from the said two dye-stuffs by its dyeing properties as our new dye-stuff produces on unmordanted cotton shades more greenish than those which are obtained in the employment of the above mentioned dye-stuffs resulting from tetrazodiphenyl chlorid or tetrazoorthoditolyl chlorid and it differs, likewise, from the product which corresponds to the formula:

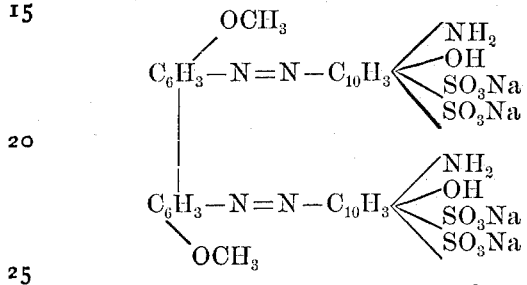

and which we have obtained by the combination of one molecular proportion of the tetrazochlorid of orthodiphenoldimethylether with two molecular proportions of the 1.8-amidonaphthol-beta-disulpho acid as described by us in a separate specification, Serial No. 436,396, filed June 11, 1892.

Having now described our invention and in what manner it can be performed, that which we claim as new, and desire to secure by Letters Patent, is—

1. The process of producing a blue coloring-matter by combining one molecular proportion of tetrazomonoethoxydiphenyl chlorid with two molecular proportions of the 1.8-amidonaphthol-beta-disulpho acid or its salts in alkaline solution.

2. As a new product the tetrazo dye-stuff which corresponds to the formula:

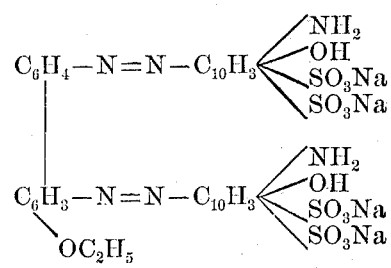

and which forms a grayish-black powder, soluble in sodium carbonate and ammonia liquid with blue, in soda-lye with violet, and in water with blue color, which solution is not changed by addition of strong mineral acids, but from its aqueous solution common salt precipitates the color as a dark blue powder; soluble in concentrated sulphuric acid with blue color, which solution changes on addition of water, at first to reddish-blue and separates after some time a fine precipitate; dyeing unmordanted cotton in alkaline soap bath a greenish-blue fast to alkalies.

In testimony whereof we have signed our names in the presence of two subscribing witnesses.

JOHANN BAMMANN.
MORITZ ULRICH.

Witnesses:
RULOLPH FRICKE,
WM. ESSENWEIN.